(12) United States Patent
Schober (10) Patent No.: US 6,783,142 B1
(45) Date of Patent: Aug. 31, 2004

(54) MOMENTUM IMPARTING BICYCLE SUSPENSION APPARATUS

(75) Inventor: Jonathan E. Schober, Lititz, PA (US)

(73) Assignee: William A. Gentile, Lebanon, PA (US); part interest ( * ) Notice: Subject to any disclaimer, the term of this patent is extended or adjusted under 35 U.S.C. 154(b) by 0 days.

(21) Appl. No.: 10/376,362

(22) Filed: Feb. 28, 2003

(51) Int. Cl.$^7$ ................................................ B62K 25/28
(52) U.S. Cl. ........................................ 280/284; 280/283
(58) Field of Search ............................... 280/284, 285, 280/286, 283, 288, 281.1; 180/227

(56) References Cited

U.S. PATENT DOCUMENTS

| | | | | |
|---|---|---|---|---|
| 606,302 A | * | 6/1898 | Royston | 280/283 |
| 2,178,939 A | * | 11/1939 | Pease | 280/283 |
| 3,030,124 A | * | 4/1962 | Holloway | 280/281.1 |
| 4,453,730 A | | 6/1984 | Klose | 280/281 |
| 4,669,747 A | * | 6/1987 | Groendal | 280/283 |
| 4,813,696 A | * | 3/1989 | Moulton | 280/281.1 |
| 5,865,456 A | * | 2/1999 | Busby et al. | 280/284 |
| 5,899,480 A | | 5/1999 | Leitner | 280/284 |
| 5,975,550 A | * | 11/1999 | Schonfeld | 280/284 |
| 6,092,823 A | | 7/2000 | Busby | 280/284 |
| 6,406,048 B1 | | 6/2002 | Castellano | 280/284 |
| 6,439,593 B1 | * | 8/2002 | Tseng | 280/284 |
| 6,450,521 B1 | * | 9/2002 | Turner | 280/284 |
| 6,471,230 B2 | | 10/2002 | Ellsworth et al. | 280/284 |

* cited by examiner

*Primary Examiner*—Lesley D. Morris
*Assistant Examiner*—Tony Winner
(74) *Attorney, Agent, or Firm*—Miller Law Group, PLLC (57) ABSTRACT

A bicycle rear suspension mechanism imparts a forward movement inducing moment about the axis of the rear wheel during the operation of the suspension mechanism. A parabolic swing arm is mounted such that the axis of rotation of the rear wheel is positioned proximate to the vertex, and preferably in alignment with the central axis, of the parabolic shape. A flexor element is formed into the perimeter of the parabolic swing arm at a location below the central axis of the parabolic shape and below and forwardly of the rear wheel axle. A shock absorber can be connected to the upper rocker arm to dampen the operation of the suspension mechanism. The release of stored energy in the flexor element directs a resultant force offset by a moment arm from the axis of rotation of the rear wheel to contribute to the forward momentum of the bicycle.

19 Claims, 9 Drawing Sheets

MOMENTUM IMPARTING BICYCLE SUSPENSION APPARATUS

BACKGROUND OF THE INVENTION

This invention relates to a suspension mechanism for a vehicle, such as a bicycle, and, more particularly, to a suspension apparatus that imparts a forward movement inducing moment to the bicycle after encountering a force compressing the suspension apparatus.

Bicycle suspension mechanisms provide a spring mechanism between the rider and the wheels of the bicycle to isolate the rider from bumps and irregularities on the path being traveled. While suspension mechanisms, particularly rear wheel suspension mechanisms, are not new in the design and manufacture of bicycles, significant interest has been generated recently with the increased popularity of mountain bikes, typically used for off-highway travel. A properly designed rear suspension mechanism will provide a greater level of comfort and energy efficiency for the rider, as well as improve handling capabilities for the bicycle, all of which can be of significant importance particularly when such bicycles are raced over uneven ground.

Most bicycle suspension mechanisms utilize a pivot device to provide a greater range of movement for the mechanism without transmitting pedal-induced movement to the mechanism. Shock absorbers are usually provided to smooth out the movement of the suspension mechanism, such as is found in U.S. Pat. No. 5,899,480, issued to Horst Leitner on May 4, 1999. A pivotless rear suspension system for bicycles can be found in U.S. Pat. No. 6,406,048, issued to John Castellano on Jun. 18, 2002. Such suspension mechanisms, whether formed with or without pivots, connect to the axle of the rear wheel which corresponds to the axis of rotation of the rear drive wheel of the bicycle. Accordingly, the forces encountered by the rear wheel traveling over uneven terrain are transmitted to the suspension mechanism which effectively absorbs the upward force exerted on the rear wheel axle and transmits any remaining force directly back to the rear wheel axle.

In U.S. Pat. No. 6,092,823, issued to James Busby on Jul. 25, 2000, a flexible joint is disclosed for use in a bicycle frame. The flexible joint includes a flat plate received within a pair of opposing adapters that are in turn mounted in respective ends of the bicycle frame tubing. The flat plate facilitates bending in a specified plane, but resists torsional movement along the longitudinal axis of the joint. These flexible joints are replacements for the pivot devices incorporated into the rear suspension system of the bicycle, allowing movement of one member relative to another along a longitudinal axis, while limiting the torsional movement of one frame member relative to the other.

None of the known bicycle rear suspension systems provide any function for the operation of the bicycle other than to isolate the rider from an uneven terrain. The storing and releasing of energy from rear suspension spring mechanisms could be advantageously utilized to enhance the momentum of the bicycle, even if only minutely. When such bicycles are raced over the course of several hours of time and many miles of uneven terrain resulting in the operation of the suspension mechanism to improve the ride characteristics of the bicycle, even minute assistance in the generation of a forward movement inducing moment would result in a significant advantage. Accordingly, it would be desirable to provide a rear suspension system for a bicycle that would result in the transmission of a moment at the rear drive wheel of the bicycle as the suspension system operates to absorb forces to isolate the rider from the bumps and terrain irregularities encountered on the trail.

SUMMARY OF THE INVENTION

It is an object of this invention to overcome the aforementioned disadvantages of the prior art bicycle rear suspension systems to provide a rear suspension system that imparts a moment at the rear drive wheel of the bicycle.

It is another object of this invention to provide an aesthetically pleasing rear suspension system.

It is still another object of this invention to provide a rear suspension system that utilizes a parabolic swing arm member to define a semi-elliptical shape for the apparatus.

It is still another object of this invention to provide a flexor within the parabolic shape of the rear suspension apparatus to focus the release of energy stored during the compression of the apparatus.

It is a feature of this invention that the flexor is located at or below and forwardly of the axis of rotation of the rear drive wheel of the bicycle.

It is another feature of this invention that the flexor element imparts a moment to contribute to the forward momentum of the bicycle when the flexor element releases energy stored therein during compression of the rear suspension mechanism.

It is an advantage of this invention that the position of the flexor within the parabolic swing arm of the rear suspension mechanism results in the creation of a forward movement inducing moment at the rear wheel of the bicycle when the rear suspension mechanism releases energy.

It is still another feature of this invention that the flexor can be formed from a carbon fiber/epoxy composite or other materials, such as titanium, to provide a lightweight flexor element that has excellent shape retention properties to provide the ability to store energy during compression of the rear suspension mechanism.

It is yet another object of this invention to combine the properties of pivoted and pivotless rear suspension mechanisms for bicycles to provide an improved rear suspension system that has a minimum of pivot devices, yet permits an efficient and effective suspension to smooth the ride characteristics for the rider.

It is still another advantage of this invention that the parabolic swing arm in the rear suspension mechanism can be adapted to incorporate a shock absorber to dampen the compression of the rear suspension mechanism.

It is yet another feature of this invention that the parabolic swing arm is adaptable to several different shock absorber configurations and orientations.

It is still another feature of this invention that the flexor is formed with a thin portion at the center of the flexor that permits the flexor to bend.

It is yet another object of this invention to mount the parabolic swing arm member such that the axis of rotation of the rear wheel is positioned proximate to the vertex of the parabolic shape to position the flexor element at or below the central axis of the parabolic shape to create a moment arm between the force exerted by the flexor element upon release of stored energy and the axis of rotation of the rear wheel.

It is another feature of this invention that the axis of rotation of the rear wheel can be oriented in alignment with the central axis of the parabolic shape of the rear suspension swing arm.

It is yet another advantage of this invention that the parabolic swing arm is oriented to spread apart as the rear suspension system operates to store energy in the flexor element.

It is a further feature of this invention that the flexor element can be formed as a separate member that is assembled into the perimeter of the parabolic swing arm or as an integral part of the parabolic swing arm.

It is yet another object of this invention to provide a connection linkage for the parabolic swing arm that forces divergence of the upper and lower legs of the swing arm when pivoted upwardly to absorbs forces encountered by the rear wheel engaging bumps and/or irregularities in the surface of the ground.

It is still a further feature of this invention to mount the connection linkage for the upper leg of the parabolic swing arm to pivot about a different pivot center than the swing arm to cause divergence of the upper and lower legs of the swing arm.

It is a further object of this invention to provide a rear suspension mechanism for a bicycle that imparts a forward motion-inducing moment to the bicycle, which is durable in construction, inexpensive of manufacture, carefree of maintenance, facile in assemblage, and simple and effective in use.

These and other objects, features and advantages are accomplished according to the instant invention by providing a bicycle rear suspension mechanism that imparts a forward movement inducing moment about the rotational axis of the rear wheel during the operation of the suspension mechanism. A parabolic swing arm that is mounted such that the axis of rotation of the rear wheel is positioned proximate to the vertex, and preferably in alignment with the central axis, of the parabolic shape. A flexor element is formed into the perimeter of the parabolic swing arm at a location below the central axis of the parabolic shape and below and forwardly of the axis of rotation of the rear wheel. A shock absorber can be connected to the upper rocker arm to dampen the operation of the suspension mechanism. The release of stored energy in the flexor element directs a resultant force offset by a moment arm from the axis of rotation of the rear wheel to contribute to the forward momentum of the bicycle.

BRIEF DESCRIPTION OF THE DRAWINGS

The advantages of this invention will become apparent upon consideration of the following detailed disclosure of the invention, especially when taken in conjunction with the accompanying drawings wherein.

DETAILED DESCRIPTION OF THE PREFERRED EMBODIMENT

Referring first to FIGS. 1–3 and 9, a bicycle provided with a rear suspension mechanism incorporating the principles of the instant invention can best be seen. Any references to left, right, up and down are determined by standing at the rear of the bicycle facing toward the handle bars and into the normal direction of travel of the bicycle. The bicycle 10 includes a frame 12 rotatably supported for movement over the ground by a front wheel 13 and a rear drive wheel 15. The frame 12 includes a front fork 14 rotatably supporting the front wheel 13. The front fork 14 is pivotably connected to the remaining frame 12 to permit steering of the bicycle 10 in a conventional manner. The frame 12 is also provided with a seat 19 for the support of the rider (not shown) as the bicycle 10 is moved over the ground. One skilled in the art will recognize that the conventional pedal-operated chain drive has been removed from the drawings for the purpose of clarity of the rear suspension mechanism 20 to be described in greater detail below.

Figure 7:
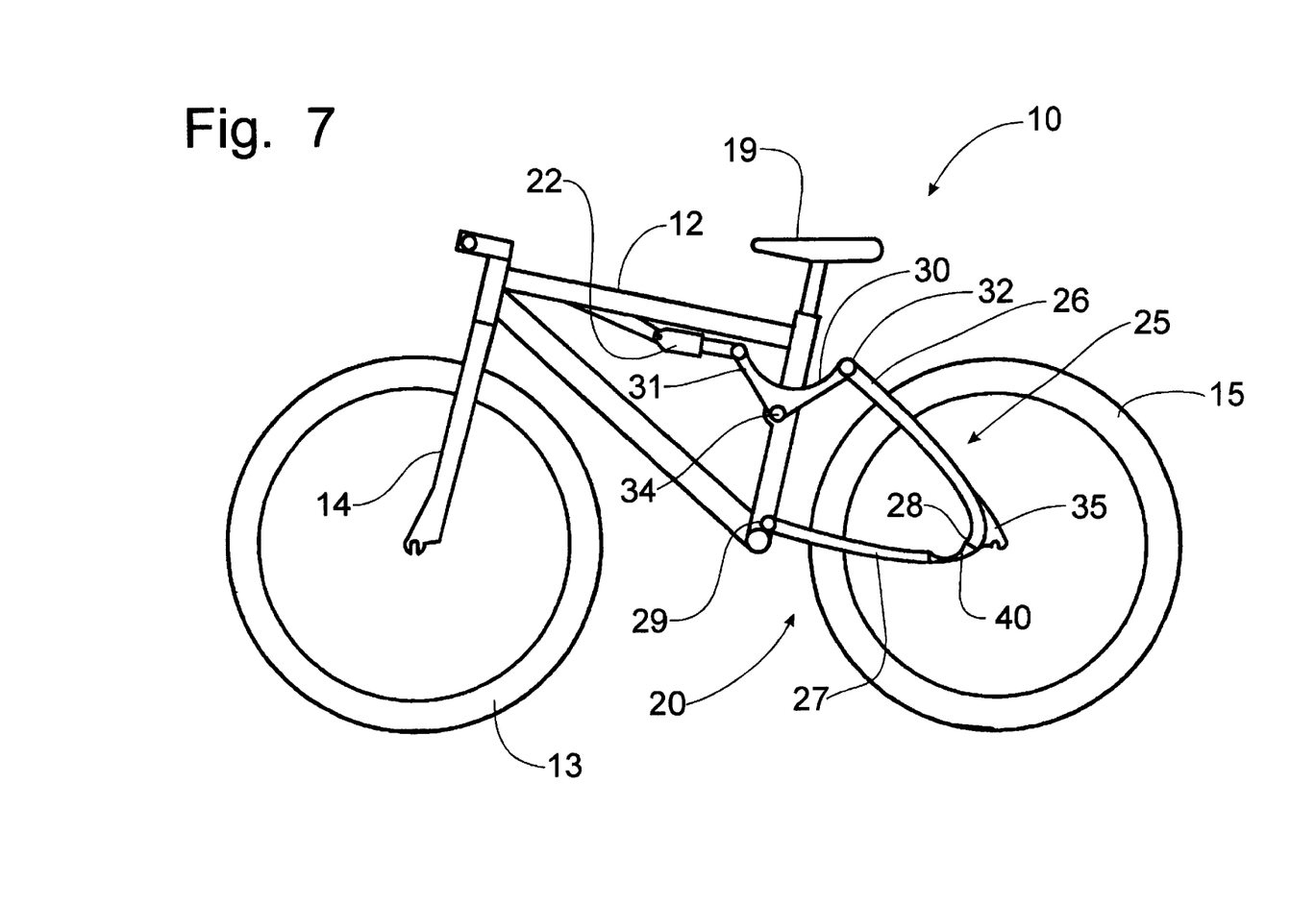
FIG. 7 is side elevational view of the bicycle similar to that of FIG. 1 but depicting a first embodiment of a shock absorber forming a part of the rear suspension system to dampen the movement of the suspension mechanism.
Figure 8:
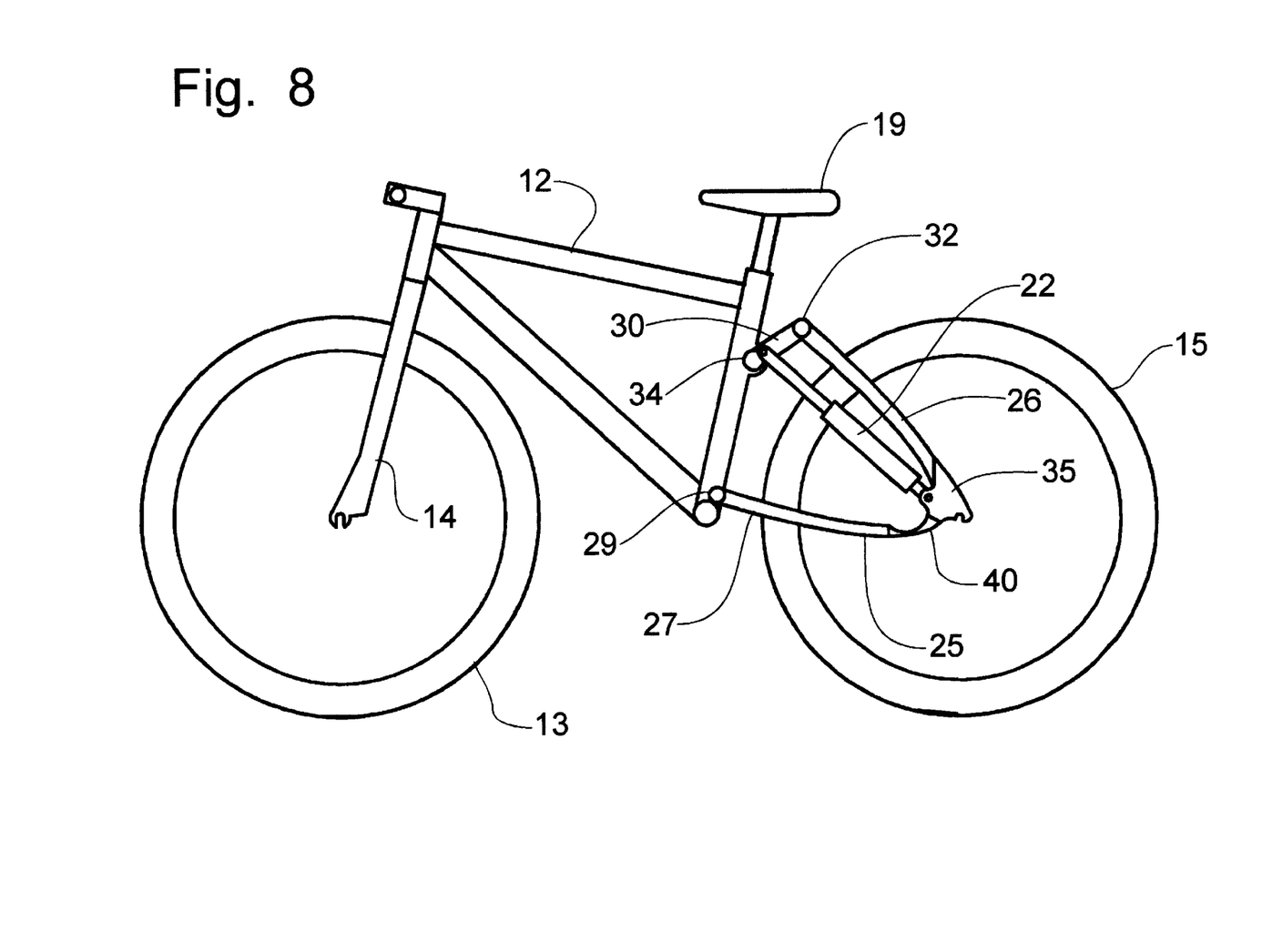
FIG. 8 is side elevational view of the bicycle similar to that of FIG. 1 but depicting a second embodiment of a shock absorber for dampening the movement of the rear suspension mechanism.

The rear wheel 15 is suspended from the frame 12 by a rear suspension mechanism 20 to permit the rear wheel 15 to move vertically relative to the frame 12 to absorb bumps and uneven terrain encountered while riding the bicycle, thus somewhat isolating the rider from the forces created when such bumps and irregularities are encountered. As can be seen in FIGS. 7 and 8, the rear suspension mechanism 20 can include a shock absorber 22 to dampen the movement of the rear wheel 15 and the operation of the rear suspension mechanism 20. The details of the arrangement of the shock absorber 22 will be described in greater detail below.

Referring now to FIGS. 1–6, the rear suspension mechanism 20 has as its primary element a semi-elliptical swing arm 25 that is formed with an upper leg 26, a lower leg 27, and a vertex 28 interconnecting the upper and lower legs 26, 27. Preferably, the swing arm 25 is formed as a parabola having a bifurcated configuration with a left side and a right side that are substantially identical and connected at the terminus of the respective ends 26a, 27a, as can be seen best in FIGS. 4 and 6, to accommodate the rotation of the rear wheel 15 between the left and right sides of the swing arm 25 rearwardly of the co-joined terminuses 26a, 27a. The terminus 27a of the lower legs 27 is connected to the frame 12 at a lower pivotal connection 29. The terminus 26a of the upper legs 26 is pivotally connected to an upper rocker arm 30 by an upper pivotal connection point 32. The upper rocker arm 30 is also pivotally connected to the frame 12 by a pivot 34. The wheel mounting bracket 35 is attached to the outer periphery of the parabolic swing arm 20 near the vertex 28 to accommodate the rotatable mounting of the rear wheel 15.

The swing arm 25 is formed with a flexor element 40 in the lower leg 27 proximate to the vertex 28. The flexor element 40 is preferably a spring member formed from a carbon fiber/epoxy composite, although other appropriate materials such as titanium and spring steel can also be used, thus providing materials that are lightweight and have an excellent shape retention memory to serve as a spring member in the perimeter of the parabolic swing arm 25. The flexor element 40 is formed with opposing ends 42 that are sized and shaped to fit within the hollow ends of the tubing forming the respective left and right lower legs 27 and the vertex 28, and has a central body 45 between the opposing ends 42. This central body 45 is formed with a depression 46 that thins the central body 45 and permits the flexor element 40 to flex, as will be described in greater detail below.

The orientation of the upper rocker arm 30 is such that the upward pivotal movement of the swing arm 25, due to the rear wheel 15 encountering an upward force corresponding to the engagement of a bump or irregularity in the ground, results in the expansion of the parabolic shape of the swing arm 25. The arrangement of the pivot center 34 for the upper rocker arm 30 at a different point than the pivot center 29 for the upward movement of the swing arm 25 causes the upper leg 27 to diverge from the lower leg 26, which is accommodated by the bending of the flexor element 40, thus storing potential energy in the flexor element 40 until the upward force is eliminated or dissipated. The return of the swing arm 25 to its normal relaxed orientation thus results in the relaxing of the flexor element 40 and the release of the stored energy, as will be described in greater detail below.

Figure 1:
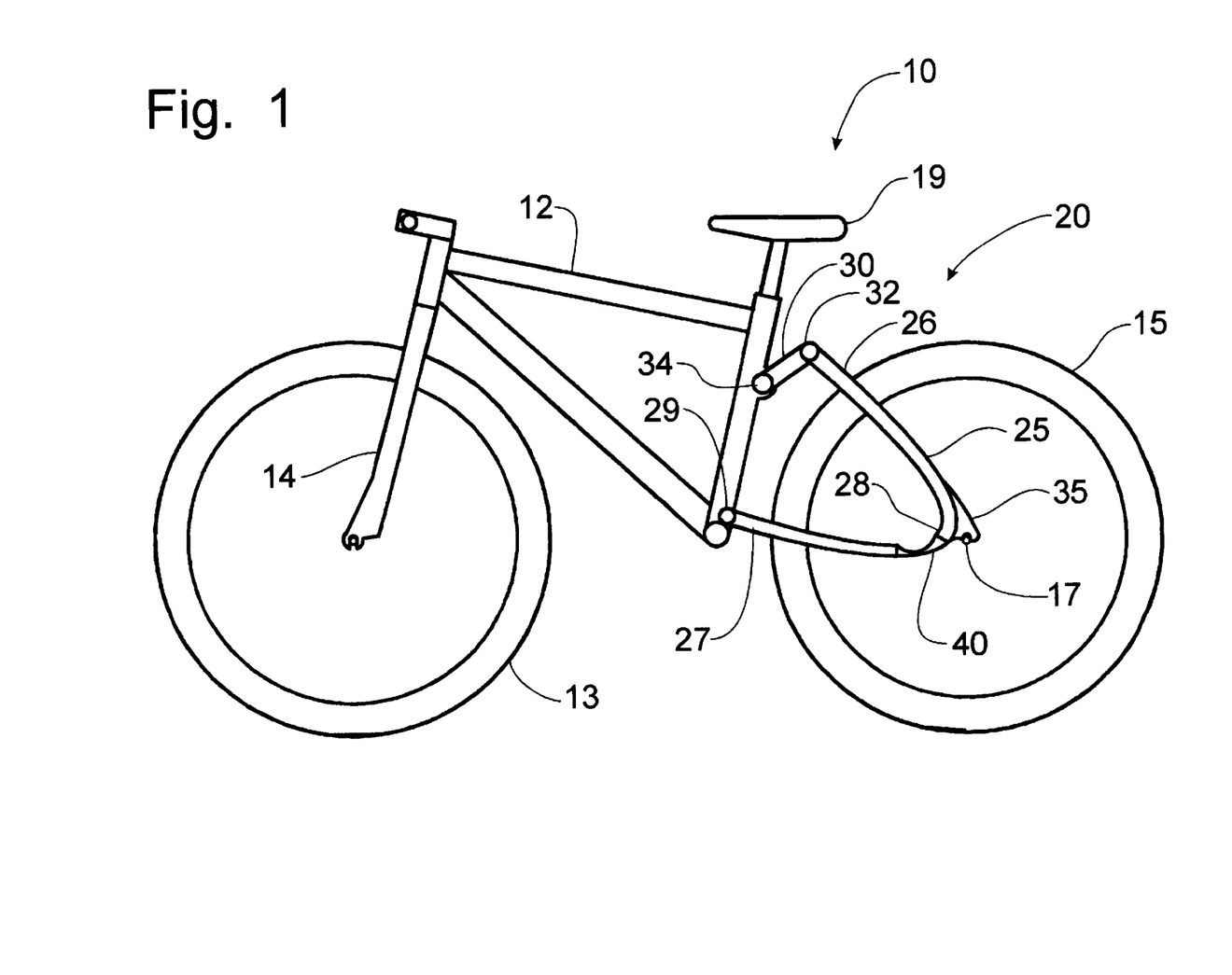
FIG. 1 is a schematic side elevational view of a bicycle incorporating the principles of the instant invention.
Figure 2:
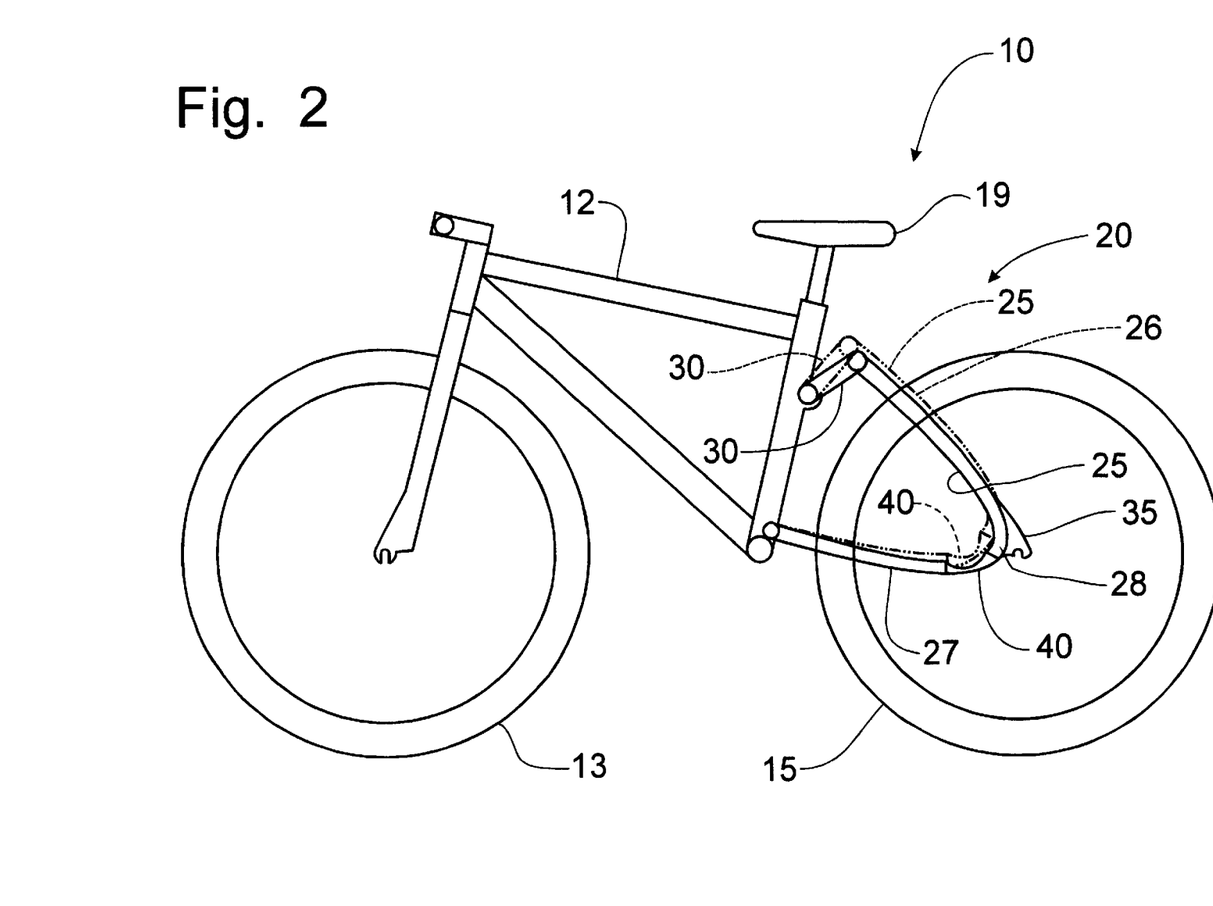
FIG. 2 is a schematic side elevational view of the bicycle shown in FIG. 1 with the movement of the parabolic swing arm being shown in phantom upon compression of the rear suspension mechanism.
Figure 3:
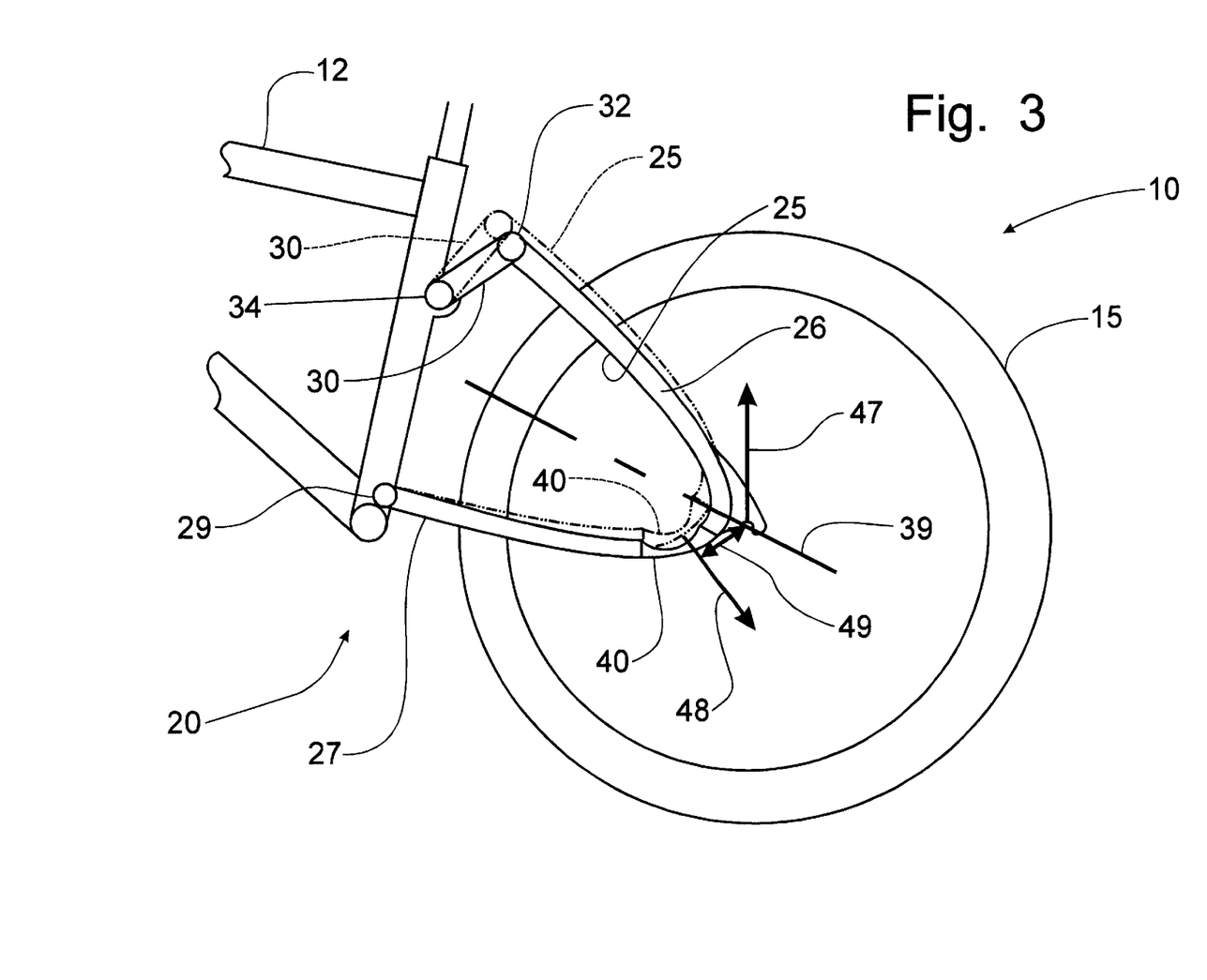
FIG. 3 is an enlarged partial elevational view of the rear portion of the bicycle depicted in FIG. 2 with the movement of the parabolic swing arm during compression of the rear suspension mechanism being shown in phantom with representative force vectors imposed to demonstrate the forward momentum imparting capabilities of the rear suspension mechanism.
Figure 4:
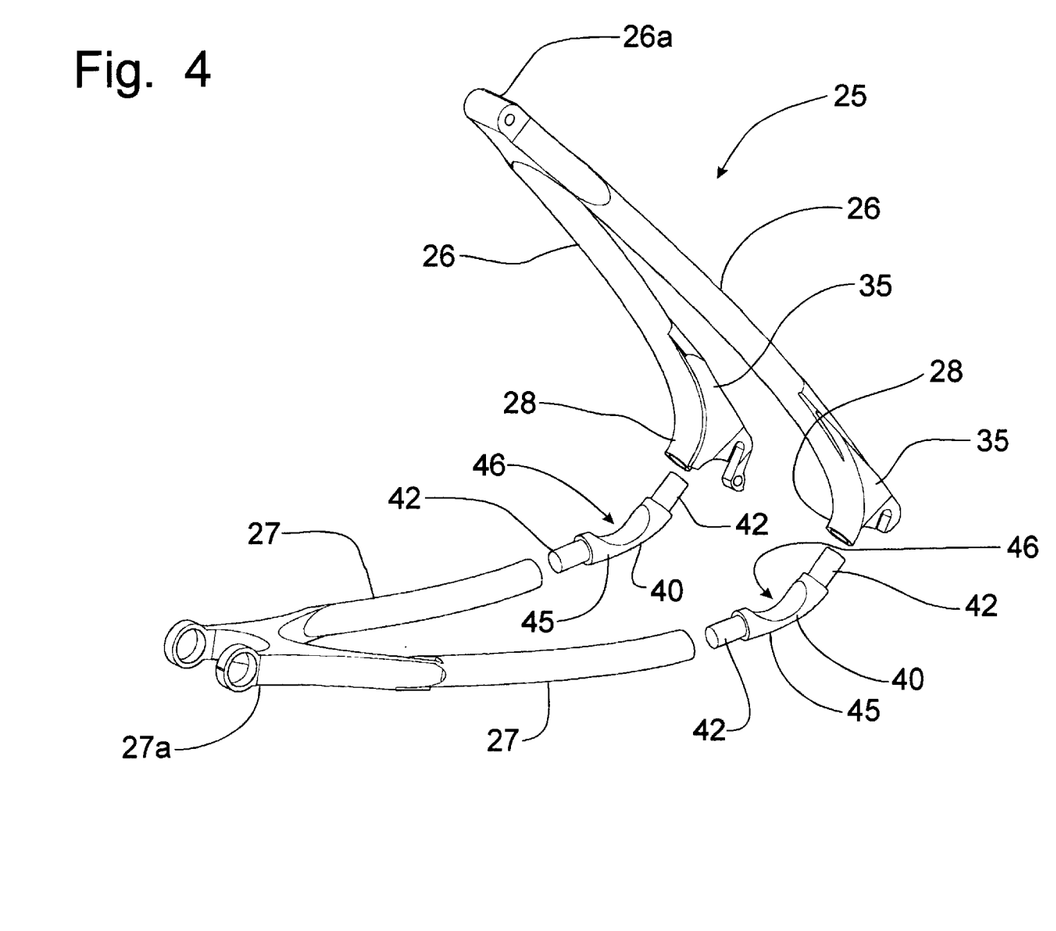
FIG. 4 is a perspective detail view of the parabolic swing arm exploded to depict the separate flexor elements located in the lower periphery of the parabolic shape.
Figure 5:
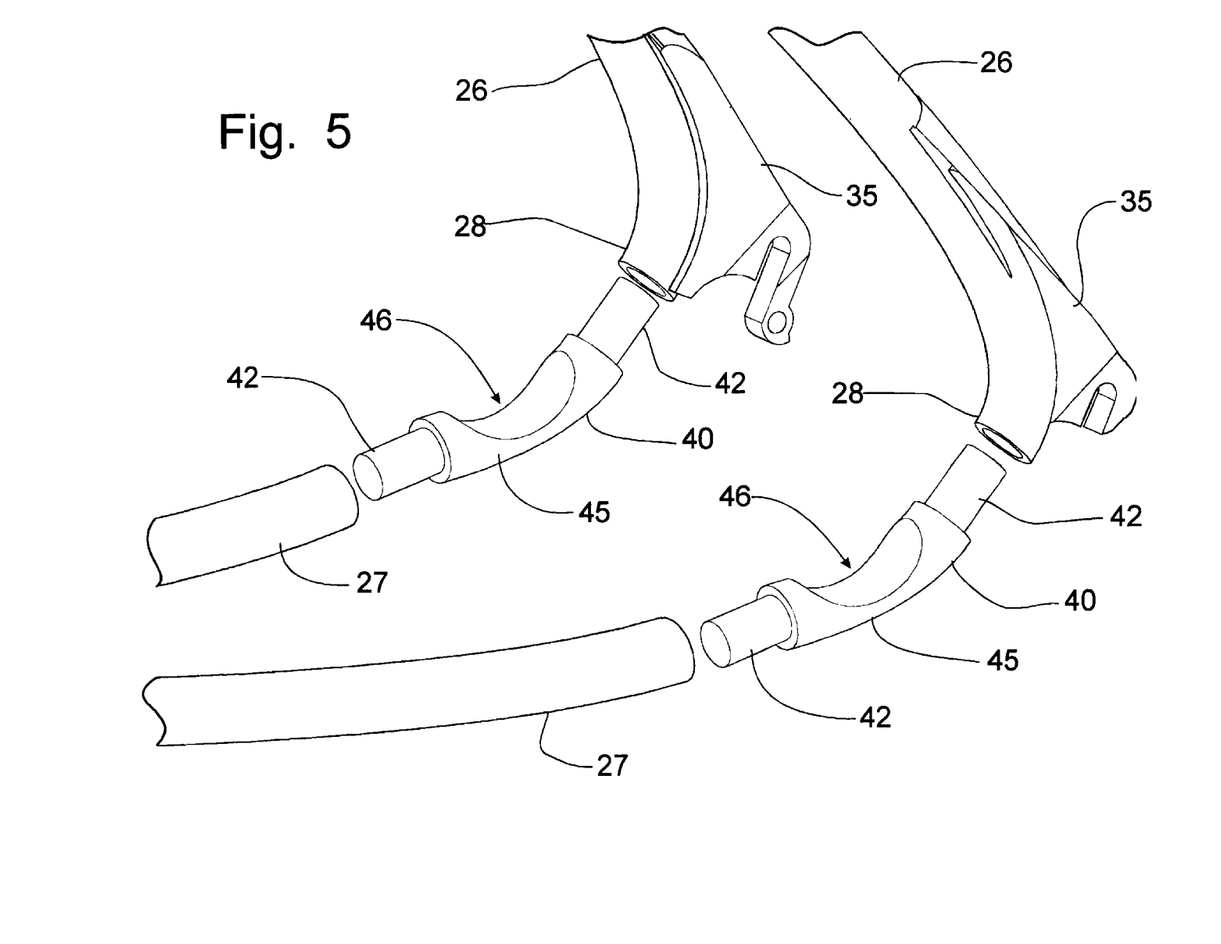
FIG. 5 is an enlarged partial detail view of the separate flexor elements exploded from the swing arm tubing.

Preferably, the upper and lower legs 26, 27 of the swing arm 25 are formed from aluminum tubing into their respective parabolic shapes. The flexor element 40 is preferably molded into its corresponding portion of the parabolic shape such that when the ends 42 of the flexor element 40 are properly inserted into the respective ends of the lower leg 26 and vertex 28, the completed assembly forms the shape of a parabola. The ends 42 of the flexor element 40 are preferably epoxied to the corresponding ends of the lower leg 26 and vertex 28 to form an integral assembly for the swing arm 25. The mounting bracket 35 is preferably welded to the upper leg 26 on the rearward surface thereof so that the slot 36 for receiving the axle 17 of the rear wheel 15 is generally aligned with the central axis 39 of the parabolic shape of the swing arm 25, as is depicted in FIG. 3. Locating the rear axle in alignment with the central axis 39 of the parabolic shape is a preferred embodiment; however, other alternative embodiments can have the rear axle 17 above the central axis 39, though proximate to the vertex 28 of the parabolic shape.

Figure 6:
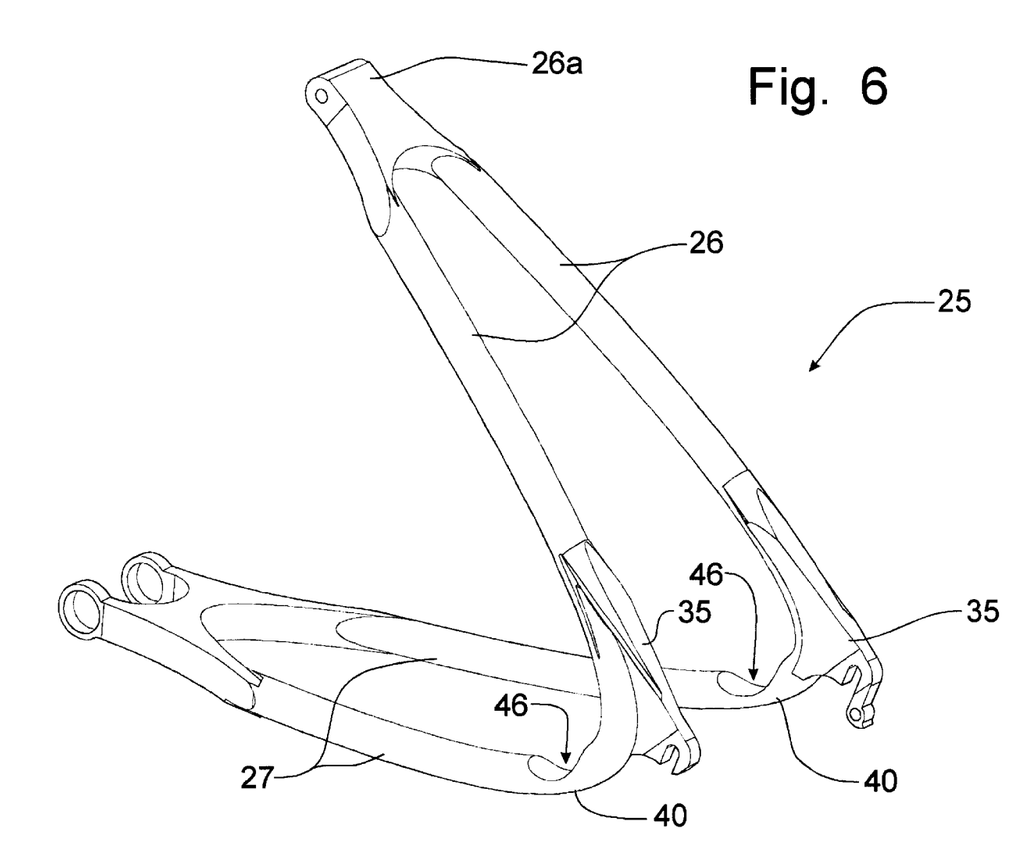
FIG. 6 is a rearward perspective view of an alternative embodiment of the parabolic swing arm with the flexor element integrally formed into the perimeter of the parabolic shape.

As is best depicted in FIG. 6, the entire swing arm 25 can be cast as an integral member with the flexor element 40 machined or formed into the appropriate location on the perimeter of the swing arm 25. In such an embodiment, the entire swing arm 25 can be formed from carbon fiber/epoxy composite. Furthermore, the mounting brackets 35 for the rear wheel 15 could also be integrally cast with the swing arm 25, or could alternatively be epoxied to the swing arm 25. The formation of the flexor element 40 can be accomplished by machining the depressions 46 into the perimeter of the swing arm 25 below the vertex 28. By narrowing the diameter of the swing arm 25 at the flexor element location, the flexibility of the swing arm 25 will be focused at a specific location as is desired for proper operation of the rear suspension mechanism 20.

As is best seen in FIGS. 7 and 8, the rear suspension mechanism 20 can include a shock absorber 22 to dampen the movement of the rear suspension mechanism 20. The placement of the shock absorber 22 can be accomplished in several different configurations, including the interconnection of the shock absorber 22 between the upper rocker arm 30 and the mounting bracket 35 as is depicted in FIG. 8. In a different configuration depicted in FIG. 7, the upper rocker arm 30 can be formed with a perpendicularly extending arm 31 which is connected to the shock absorber 22. The opposing end of the shock absorber 22 can be mounted on the frame 12 so that when the upper rocker arm 30 pivots in response to the movement of the rear suspension mechanism 20, as will be described in greater detail below, the shock absorber 22 dampens the movement, and thus the movement of the entire rear suspension mechanism 20.

In operation, any force exerted on the rear wheel 15, such as the rear wheel encountering a bump or irregularity in the ground over which the bicycle 10 is traveling, or if the rider sits down on the seat 22 hard, which is graphically depicted in FIG. 3 by the force vector 47, the rear suspension mechanism 20 responds by rotating upwardly about the lower pivot connection 29, which because of the orientation of the upper rocker arm 30 expands the parabola formed by the swing arm 25. The movement of the upper rocker arm 30 about a different pivot center than the swing arm 25 causes the flexor element 40 to bend. This expansion of the parabolic shape of the swing arm 25 is permitted through the flexing of the flexor element 40 which serves to store energy in the flexor element 40 due to the shape retention memory of the material. After the force incurred by the rear wheel 15 is dissipated, the energy stored in the flexor element 40 is then released as the parabolic shape of the swing arm 25 returns to its original shape and configuration. The release of the energy from the flexor element 40 is represented in FIG. 3 as force vector 48.

The positioning of the flexor element 40 at or below the vertex 28 of the parabolic shape of the swing arm 25 creates a moment arm 49 between the force of the energy released from the flexor element 40, represented by the force vector 48, and the axle 17 of the rear wheel 15. The result is that the parabolic swing arm 25 then imparts a moment to the frame 12 of the bicycle 10 with the release of the energy stored in the flexor element 40 to urge a forward movement, or to contribute to the forward momentum, of the bicycle 10. As the rear wheel 15 returns to the normal position, the force released by the flexor element 40 imparts a forward motion inducing moment to the frame 12 of the bicycle 10. Because of the frictional forces between the rear wheel 15 and the ground G, this moment generated by the release of the stored energy in the flexor element 40 urges the forward movement of the frame, and thus the forward rotation of the rear wheel 15, thus adding to the requisite energy for moving the bicycle 10 forwardly.

Accordingly, the operation of the rear suspension mechanism 20 to isolate the rider from the bumps and irregularities encountered on the surface of the ground helps to propel the bicycle 10 forwardly. While the amount of forward momentum generated by the instantaneous release of energy from the flexor element 40 is not a substantial amount, the accumulation of the generated moment over a period of time, such as the length of a race of such bicycles 10, provides a potentially significant advantage for the rider in such circumstances.

Figure 9:
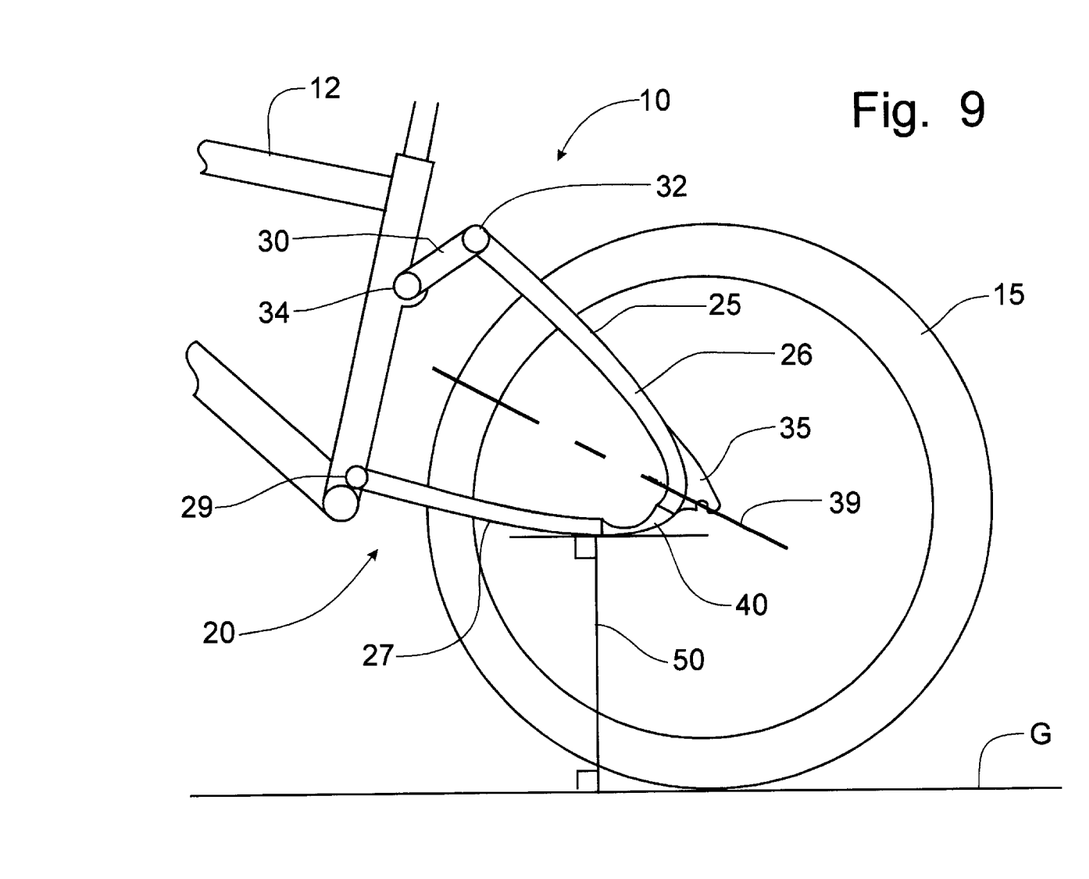
FIG. 9 is an enlarged partial elevational view of the rear portion of the bicycle similar to that of FIG. 3 to depict the location of the flexor element within the perimeter of the parabolic rear suspension swing arm.

Preferably, the flexor element 40, which focuses the release of stored energy during the operation of the rear suspension mechanism 20, is positioned at or below the vertex 28 of the parabolic shape of the swing arm 25 so as to impart moment that contributes to the forward momentum of the bicycle 10, instead of rearwardly. As depicted in FIG. 9, the flexor element 40 is preferably located closer to the vertex 28 than to a position corresponding to a vertical line 50 that is perpendicular to the tangent of the parabola along the lower leg 27 of the swing arm 25 and also perpendicular to the surface of the ground G. Placement of the flexor element 40 in this area of the swing arm 25 will result in a focused release of stored energy from the flexor element 40 to impart a forward movement-inducing moment to the bicycle 10 during operation of the rear suspension mechanism 20.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention.

Having thus described the invention, what is claimed is:

1. A rear suspension mechanism for a rear wheel assembly of a vehicle having a frame rotatably supporting said rear wheel assembly to isolate a rider from irregularities in the ground during operation of the bicycle, comprising:

a semi-elliptical swing arm having a lower leg and an upper leg, said rear wheel assembly having an axle supported at a vertex, one of said lower and upper legs being connected to said frame;

a rocker arm pivotally connected to the other of said lower and upper legs and being pivotally connected to said frame; and said swing arm including a flexor element to permit said upper and lower legs to diverge when a generally vertical force is applied to said rear wheel, said rocker arm permitting said upper and lower legs to diverge, said flexor element being formed to focus bending action of said swing arm at said flexor element to impart a forward movement-inducing moment relative to said rear wheel assembly axle.

2. The rear suspension mechanism of claim 1 wherein said swing arm is formed in a generally parabolic shape defining a central axis and a vertex.

3. The rear suspension mechanism of claim 2 wherein said flexor element is positioned in said lower leg below and proximate to said vertex.

4. The rear suspension mechanism of claim 3 wherein said flexor element is formed with a thinner cross-section than said lower leg, whereby said bending action is focused in said flexor element.

5. The rear suspension mechanism of claim 2 wherein said rear wheel assembly is connected to said swing arm such that said axle is located in general alignment with said central axis of said parabolic swing arm, said flexor element being positioned below said central axis so as to define a moment arm between a force generated by a release of energy stored in said flexor element and said rear wheel axle.

6. The rear suspension mechanism of claim 5 wherein said vehicle is a bicycle, the bending of said flexor element during divergence of said upper and lower legs of said swing arm in response to said generally vertical force being applied to said rear wheel assembly stores potential energy in said flexor element, the release of said potential energy upon the return of flexor element to a relaxed state imparting said forward movement-inducing moment on said bicycle.

7. The rear suspension mechanism of claim 6 wherein said flexor element is formed as a separate member assembled with said upper and lower legs to form said swing arm, said flexor member having a pair of opposing ends sized to mate internally of said upper and lower legs, which are formed from hollow tubing, said opposing ends being bonded, respectively, to said upper and lower legs.

8. The rear suspension mechanism of claim 6 further comprising:

a shock absorber connected to said rocker arm to dampen pivotal movement thereof in association with the divergence of said upper and lower legs.

9. The rear suspension mechanism of claim 6 wherein said flexor element is formed as an integral member with said upper and lower legs of said swing arm.

10. In a bicycle having a frame, a front wheel rotatably supported on said frame, and a rear wheel rotatably supported from said frame, an improved rear suspension mechanism for supporting said rear wheel from said frame to permit generally vertical movement of said rear wheel relative to said frame comprising:

a semi-elliptical swing arm having a lower leg and an upper leg, said rear wheel having an axle rotatably mounted to said swing arm proximate to a vertex; and a flexor element operably connected to said swing arm to permit said upper and lower legs to diverge when a generally vertical force is applied to said rear wheel, said flexor element bending to store energy as said upper and lower legs diverge, said flexor element being positioned to define a moment arm between a force generated by a release of energy stored in said flexor element and said rear wheel axle to impart a forward movement-inducing moment on said bicycle.

11. The bicycle of claim 10 wherein said flexor element is positioned in said lower leg of said swing arm to impart said forward movement inducing moment when said flexor element releases the stored energy when returning to a relaxed state.

12. The bicycle of claim 11 further comprising a rocker arm pivotally connected to said frame and to one of said upper and lower legs to force divergence therebetween when said swing arm encounters a force exerted by said rear wheel.

13. The bicycle of claim 12 wherein said body portion of said flexor element is formed with a thinned cross-sectional diameter when compared with said upper and lower legs so as to focus the bending action of said swing arm at said flexor element.

14. The bicycle of claim 10 wherein said swing arm is formed as a parabola having a central axis, said rear wheel having an axle mounted on a mounting bracket affixed to said vertex such that said rear wheel axle is generally aligned with said central axis, said flexor element being positioned below said central axis so as to be offset from said rear wheel axle to impart said forward movement-inducing moment thereto upon the release of stored energy.

15. The bicycle of claim 14 further comprising:

a shock absorber connected to said rocker arm to dampen pivotal movement thereof in association with the divergence of said upper and lower legs.

16. A method of suspending a rear wheel of a vehicle from a frame member of said vehicle comprising the steps of:

providing a rear suspension mechanism interconnecting an axle of said rear wheel and a frame member of said vehicle, said rear suspension mechanism having a flexor member that stores energy during operation of said rear suspension mechanism, said stored energy being released when said rear suspension mechanism returns to a relaxed state; and locating said flexor member within said rear suspension mechanism such that the release of said stored energy from said flexor member exerts a force that is offset from said rear wheel axle by a moment arm to produce a forward momentum-inducing moment about said rear wheel axle and, thereby, contribute to the forward momentum of said vehicle.

17. The method of claim 16 wherein said providing step includes the step of:

forming said rear suspension mechanism with a parabolic swing arm having an upper leg and a lower leg interconnected by a vertex with said rear wheel axle being mounted to said vertex, said flexor member bending to store energy during operation of said rear suspension mechanism and to permit said upper and lower legs to diverge.

18. The method of claim 17 wherein said locating step positions said flexor member in said lower leg below and proximate to said vertex.

19. The method of claim 18 further comprising the step of pivotally coupling one of said upper and lower legs of said swing arm to said vehicle frame by a rocker arm to force said upper and lower legs to diverge when said parabolic swing arm pivots in response to encountering a force exerted on said rear wheel.

* * * * *